(12) United States Patent
Zhao et al.

(10) Patent No.: US 10,831,053 B2
(45) Date of Patent: Nov. 10, 2020

(54) DISPLAY PANEL AND DISPLAY DEVICE

(71) Applicant: BOE TECHNOLOGY GROUP CO., LTD., Beijing (CN)

(72) Inventors: Wenqing Zhao, Beijing (CN); Xue Dong, Beijing (CN); Xiaochuan Chen, Beijing (CN); Haiyan Wang, Beijing (CN); Chenyu Chen, Beijing (CN); Zhongxiao Li, Beijing (CN); Xiaochen Niu, Beijing (CN); Qian Wang, Beijing (CN); Jinye Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 309 days.

(21) Appl. No.: 15/758,698

(22) PCT Filed: Sep. 13, 2017

(86) PCT No.: PCT/CN2017/101474
§ 371 (c)(1),
(2) Date: Mar. 8, 2018

(87) PCT Pub. No.: WO2018/126730
PCT Pub. Date: Jul. 12, 2018

(65) Prior Publication Data
US 2020/0142247 A1    May 7, 2020

(30) Foreign Application Priority Data
Jan. 6, 2017   (CN) .......................... 2017 1 0010540

(51) Int. Cl.
*G02F 1/1335*   (2006.01)
*G02F 1/13357*  (2006.01)
(Continued)

(52) U.S. Cl.
CPC ...... *G02F 1/133512* (2013.01); *G02F 1/1337* (2013.01); *G02F 1/13439* (2013.01);
(Continued)

(58) Field of Classification Search
CPC ......... G02F 1/133512; G02F 1/133514; G02F 1/1337; G02F 1/133504; G02F 1/133617;
(Continued)

(56) References Cited

U.S. PATENT DOCUMENTS 5,671,028 A * 9/1997 Okano ................. G02B 6/0053
349/57
2008/0252720 A1* 10/2008 Kim ..................... H04N 13/305
348/59

(Continued)

FOREIGN PATENT DOCUMENTS

CN    102629041 A    8/2012
CN    102650790 A    8/2012
(Continued)

OTHER PUBLICATIONS

Office Action received for Chinese Patent Application No. 201110010540.1, dated Mar. 5, 2018, 10 pages (4 pages of English Translation and 6 pages of Office Action).
(Continued)

*Primary Examiner* — Shan Liu
(74) *Attorney, Agent, or Firm* — Womble Bond Dickinson (US) LLP

(57) ABSTRACT

This disclosure provides a display panel, including a first substrate, a second substrate, a liquid crystal layer between them, a first black matrix layer at a side of the first substrate facing the second substrate, a second black matrix layer at a side of the second substrate facing the first substrate, and an electrode layer at a side of at least one of the first substrate and the second substrate facing the liquid crystal layer. Each
(Continued)

pixel unit includes at least one pixel portion. A region of the first black matrix layer corresponding to the pixel portion includes a light shielding portion and a light transmission portion, a region of the second black matrix layer corresponding to the light shielding portion is provided with a light through hole, an orthogonal projection of the light shielding portion on the second black matrix layer covers the light through hole.

14 Claims, 5 Drawing Sheets

(51) Int. Cl.
*G02F 1/1337* (2006.01)
*G02F 1/1343* (2006.01)

(52) U.S. Cl.
CPC .. *G02F 1/133504* (2013.01); *G02F 1/133514* (2013.01); *G02F 1/133617* (2013.01); *G02F 1/134309* (2013.01); *G02F 2202/36* (2013.01)

(58) Field of Classification Search
CPC ........... G02F 1/13439; G02F 1/134309; G02F 2202/36; G02F 1/136209; G02F 1/13473; G02F 1/133371; G02F 2001/136222; G02F 2001/136218; H01J 11/44; H01J 2211/444; H01J 2329/323; H01J 29/327
USPC ................................................. 349/106–111
See application file for complete search history.

(56) References Cited

U.S. PATENT DOCUMENTS

| | | | | |
|---|---|---|---|---|
| 2011/0032438 | A1* | 2/2011 | Yun | H04N 13/317 349/15 |
| 2011/0128456 | A1* | 6/2011 | Son | G02F 1/133526 349/15 |
| 2011/0157497 | A1* | 6/2011 | Kim | H04N 13/305 349/15 |
| 2011/0175906 | A1* | 7/2011 | Zheng | H04N 13/305 345/419 |
| 2013/0070188 | A1* | 3/2013 | Ishikawa | G02F 1/133512 349/110 |
| 2013/0135545 | A1* | 5/2013 | Jung | H04N 13/305 349/33 |
| 2013/0235304 | A1 | 9/2013 | Lee | |
| 2014/0063382 | A1 | 3/2014 | Wu | |
| 2014/0218664 | A1* | 8/2014 | Nimura | G02F 1/133526 349/95 |
| 2015/0077966 | A1* | 3/2015 | Bessho | G02B 5/0242 362/19 |
| 2016/0085118 | A1* | 3/2016 | Lee | G02F 1/133512 349/62 |

FOREIGN PATENT DOCUMENTS

| | | |
|---|---|---|
| CN | 202443185 U | 9/2012 |
| CN | 104730763 A | 6/2015 |
| CN | 205809488 U | 12/2016 |
| CN | 106526942 A | 3/2017 |
| CN | 106707608 A | 5/2017 |
| CN | 106773218 A | 5/2017 |
| CN | 106802520 A | 6/2017 |
| JP | 2013-218133 A | 10/2013 |

OTHER PUBLICATIONS

International Search Report received for PCT Patent Application No. PCT/CN2017/101474, dated Dec. 18, 2017, 8 pages (3 pages of English Translation and 5 pages of Original Document).

Office Action received for Chinese Patent Application No. 201710010540.1, dated Mar. 5, 2018, 10 pages (4 pages of English Translation and 6 pages of Office Action).

* cited by examiner

DISPLAY PANEL AND DISPLAY DEVICE

CROSS REFERENCE OF RELATED APPLICATION

The present application claims the priority benefit of the patent application No. 201710010540.1 filed to China's SIPO on Jan. 6, 2017, the disclosure of which is incorporated herein by reference.

TECHNICAL FIELD

This disclosure relates to the field of display technology, particularly to a display panel and a display device.

BACKGROUND

The conventional liquid crystal display device, as shown in FIG. 1, comprises a backlight module 20 and a display panel 10. The display panel 10 comprises an array substrate 11, a color film substrate 12 and a liquid crystal layer 13 between them. Two polarizers (an upper polarizer 14 and a lower polarizer 15) whose polarizing directions are perpendicular to each other are arranged at the outer sides of the array substrate 11 and the color film substrate 12 respectively. A lower electrode 16 is arranged on the array substrate 11, and an upper electrode 17 is arranged on the color film substrate 12, an electric field for driving the liquid crystals to deflect is generated between the upper electrode 17 and the lower electrode 16. When performing display, the lower polarizer 15 converts the natural light from the backlight module 20 into linearly polarized light, and the liquid crystal molecules of the liquid crystal layer 13 deflect in response to the electric field so as to convert the linearly polarized light into elliptically polarized light. The upper polarizer 14 performs polarization detection to the light, so as to realize gray scale display.

Such a display device uses two polarizers to polarize the light, which reduces the light energy greatly. The light transmittance is only about 5%, thereby generating problems of high energy consumption and low utilization rate for the display device.

SUMMARY

This disclosure intends to at least mitigate or solve one of the technical problems existing in the prior art, and proposes a display panel and a display device, so as to reduce loss of light energy and improves utilization rate of light.

An embodiment of this disclosure provides a display panel, comprising: a first substrate and a second substrate opposite to each other; a liquid crystal layer between the first substrate and the second substrate; a first black matrix layer located at a side of the first substrate facing the second substrate; a second black matrix layer located at a side of the second substrate facing the first substrate, and an electrode layer located at a side of at least one of the first substrate and the second substrate facing the liquid crystal layer, for generating an electric field in the liquid crystal layer. The display panel comprises a plurality of pixel units, each pixel unit comprising at least one pixel portion, a region of the first black matrix layer corresponding to the pixel portion comprises a light shielding portion and a light transmission portion surrounding the light shielding portion, a region of the second black matrix layer corresponding to the light shielding portion is provided with a light through hole, and an orthogonal projection of the light shielding portion on the second black matrix layer covers the light through hole.

In some embodiments, the electrode layer comprises a plurality of first electrodes and at least one second electrode, the plurality of first electrodes are located in a same layer, and are spaced apart from the second electrode by an insulating layer, the first electrodes are spaced apart from each other.

In some embodiments, the electrode layer comprises a plurality of first electrodes and second electrodes, the first electrodes and the second electrodes are spaced apart from each other and are alternately arranged in a same layer.

In some embodiments, the first electrodes are strip electrodes, the second electrode is one continuous planar electrode, the first electrodes are arranged between the second electrode and the liquid crystal layer.

In some embodiments, two electrode layers are arranged between the first black matrix layer and the liquid crystal layer and between the second black matrix layer and the liquid crystal layer respectively, a length direction of the first electrodes in one electrode layer is perpendicular to that of the first electrodes in the other electrode layer.

In some embodiments, an interval between two adjacent first electrodes is in a range of 760 nm~15600 nm.

In some embodiments, the light transmission portion is used for converting a color of incident light to the light transmission portion, a predetermined number of pixel units in the plurality of pixel units constitute a repeating group, wherein the light transmission portions corresponding to a same pixel unit in different repeating groups converts the incident light into light of a same color, and the light transmission portions corresponding to different pixel units in a same repeating group convert the incident into light of different colors.

In some embodiments, the light transmission portion is made of a color resistance material.

Alternatively, in some embodiments, the light transmission portion is made of a quantum dot material.

In some embodiments, the display panel further comprises a light diffusion film arranged at a side of the first black matrix layer away from the second substrate.

In some embodiments, the first black matrix layer is arranged between the first substrate and the liquid crystal layer, the second black matrix layer is arranged between the second substrate and the liquid crystal layer. The electrode layer is located between the first black matrix layer and the second black matrix layer.

In some embodiments, the display panel further comprises alignment layers located at two sides of the liquid crystal layer respectively, for performing alignment to liquid crystals of the liquid crystal layer.

In some embodiments, a thickness of the liquid crystal layer is in a range of 1 μm~30 μm.

Another embodiment of this disclosure provides a display device, comprising a backlight module and a display panel according to any of the above embodiments arranged at a light exit light of the backlight module. The backlight module is used for providing natural light for the display panel.

In some embodiments, the backlight module comprises a backlight source for emitting light and an alignment film arranged between the backlight source and the display panel. The alignment film is used for defining a divergence angle of light emitted by the backlight module to be in a range of 0°~30°.

In some embodiments, the alignment film comprises a transparent layer and a plurality of light shielding barriers in the transparent layer.

For the embodiments of this disclosure, when the display panel performs display, collimated or quasi collimated light is radiated towards the display panel from a side of the second substrate away from the first substrate. When the liquid crystals in the pixel unit are arranged regularly, the light passes through the light through hole and is incident into the liquid crystal layer without changing the direction so as to be shielded by the light shielding portion of the first black matrix layer, thereby enabling the pixel unit to present a dark state. When an electric field is applied in the pixel unit so as to enable the liquid crystals in a corresponding area to be deflected, the deflected liquid crystals can be equivalent to a lens. The light is scattered when it passes through the light through hole and is incident into the lens, so that at least a part of light is emitted from the light transmission portion around the light shielding portion, so as to generate a corresponding brightness. Therefore, the brightness of each pixel unit can be controlled by controlling the electric field intensity for each pixel unit, so as to display the images. Compared to the conventional display panel, the display panel provided by embodiments of this disclosure does not need a polarizer to polarize the light, thereby reducing loss of light energy and improving light efficiency and light transmittance. Moreover, the amount of light emitted from the display device is adjusted by controlling deflection of liquid crystals, so a fast response can be achieved.

BRIEF DESCRIPTION OF DRAWINGS

The drawings are used for providing further understanding of this disclosure and constitute a part of the description for explaining this disclosure together with the following specific embodiments. However, they do not constitute limitations to the invention. In the drawings.

The following reference signs may be used:
10—display panel, 11—array substrate, 12—color film substrate,
13—liquid crystal layer, 14—upper polarizer, 15—lower polarizer, 16—lower electrode, 17—upper electrode, 20—backlight module,
30a—pixel unit, 31—first substrate, 32—second substrate, 33—liquid crystal layer, 34—first black matrix layer, 341—light shielding portion, 342—light transmission portion, 343—light shielding portion, 35—second black matrix layer, 351—light through hole, 36—electrode layer, 361—first electrode, 362—second electrode, 363—transparent insulating layer, 37—light diffusion film, 40—backlight module, 41—backlight source, 42—alignment film, 421—transparent layer, 422—barrier.

DETAILED DESCRIPTION OF EMBODIMENTS

Next, embodiments of this disclosure will be explained in details in conjunction with the drawings. It should be understood that the embodiments described herein are only used for illustrating and explaining this disclosure rather than limiting the invention.

Figure 1:
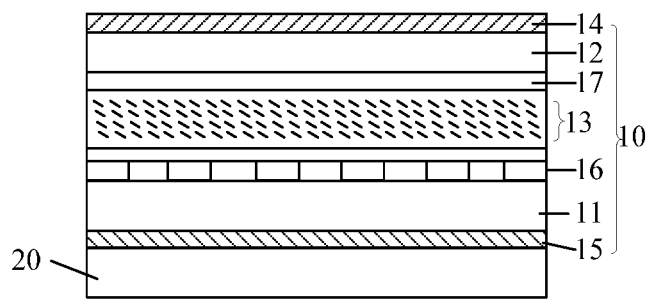
FIG. 1 is a structural schematic view of a display device in the prior art.
Figure 2:
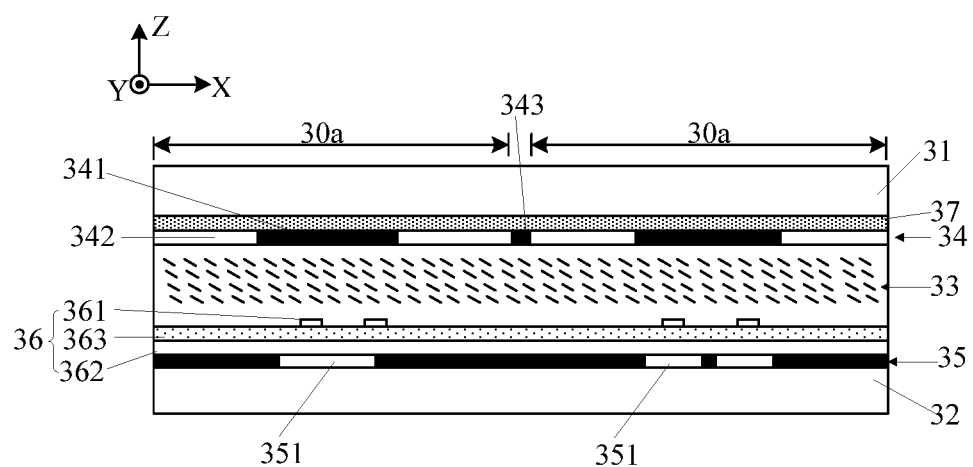
FIG. 2 is a sectional view of a display panel perpendicular to axis Y provided by an embodiment of this disclosure.
Figure 3A:
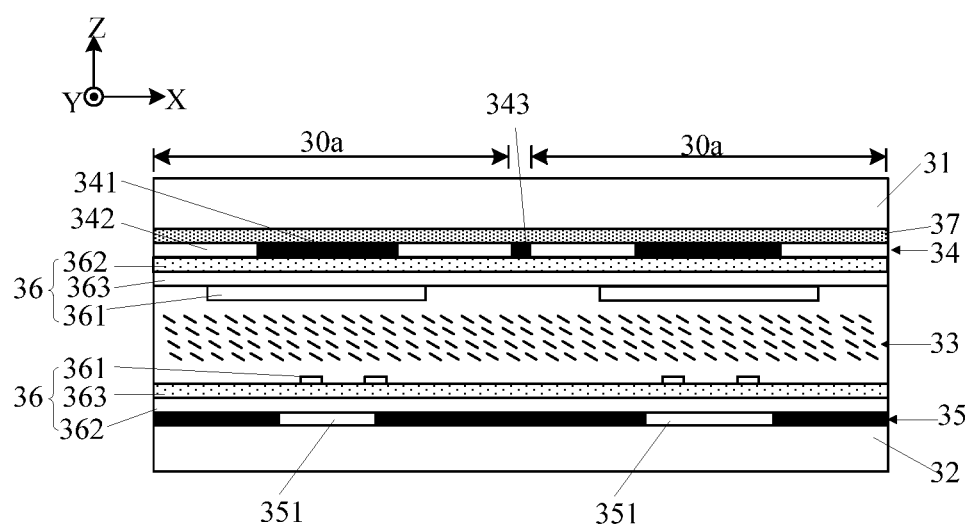
FIG. 3a is a sectional view of a display panel perpendicular to axis Y provided by another embodiment of this disclosure.
Figure 3B:
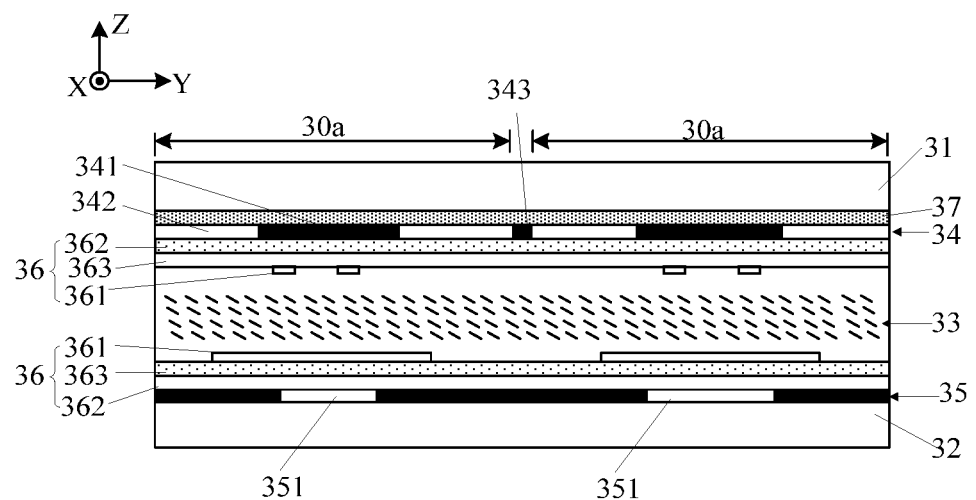
FIG. 3b is a sectional view of a display panel perpendicular to axis X provided by another embodiment of this disclosure.

As an aspect of the disclosure, a display panel is provided, as shown in FIGS. 2-3b. The display panel comprises a first substrate 31 and a second substrate 32 opposite to each other as well as a liquid crystal layer 33 between the first substrate 31 and the second substrate 32. The display panel comprises a plurality of pixel units 30a, each pixel unit 30a comprising at least one pixel portion. A first black matrix layer 34 is arranged at a side of the first substrate 31 facing the second substrate 32, and a second black matrix layer 35 is arranged at a side of the second substrate 32 facing the first substrate 31. A part of the first black matrix layer 34 corresponding to the pixel portion comprises a light shielding portion 341 and a light transmission portion 342 surrounding the light shielding portion 341. A part of the second black matrix layer 35 corresponding to the light shielding portion 341 comprises a light through hole 351. An orthogonal projection of the light shielding portion 341 on the second black matrix layer 35 covers the light through hole 351. The part of the second black matrix layer 35 corresponding to the light shielding portion 341 may comprise one light through hole 351 and also may comprise a plurality of light through holes 351, as long as the light through holes 351 can all be covered by the orthogonal projection of the corresponding light shielding portion 341. The display panel further comprises an electrode layer 36 between the first substrate 31 and the second substrate 32. The electrode layer 36 is used for generating an electric field in the liquid crystal layer 33. The electric field for each pixel unit 30a can be controlled independently. The liquid crystal layer 33 can be a nematic phase liquid crystal layer.

The pixel portion mentioned herein refers to a sub-area of the pixel unit, which corresponds to a light shielding portion of the first black matrix layer and a light transmission portion surrounding the light shielding portion.

Figure 5A:
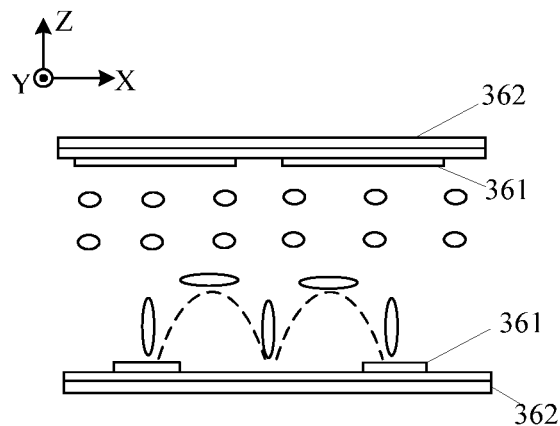
FIG. 5a is a schematic view for illustrating the deflection of liquid crystal molecules when the electrode layer on the second substrate generates an electric field.
Figure 5B:
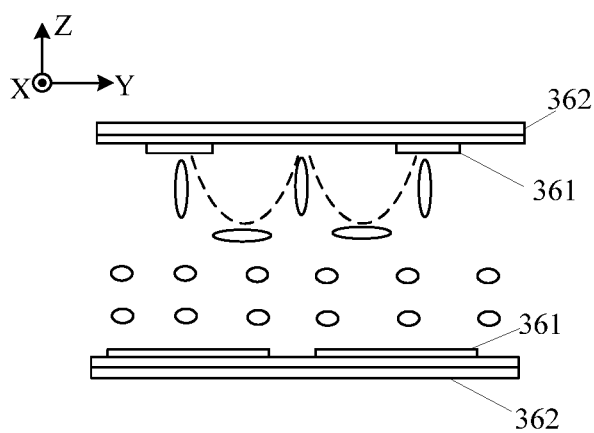
FIG. 5b is a schematic view for illustrating the deflection of liquid crystal molecules when the electrode layer on the first substrate generates an electric field.
Figure 6A:
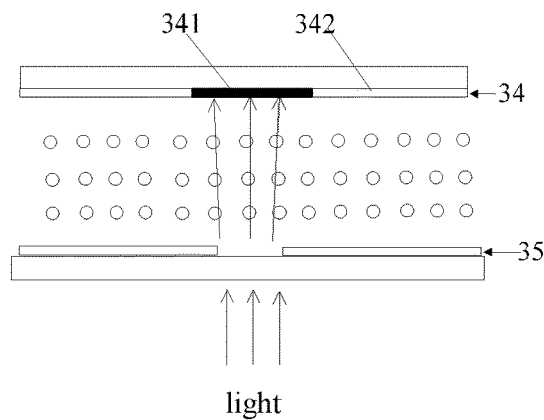
FIG. 6a is a schematic diagram when the display panel in an embodiment of this disclosure realizes a dark state.
Figure 6B:
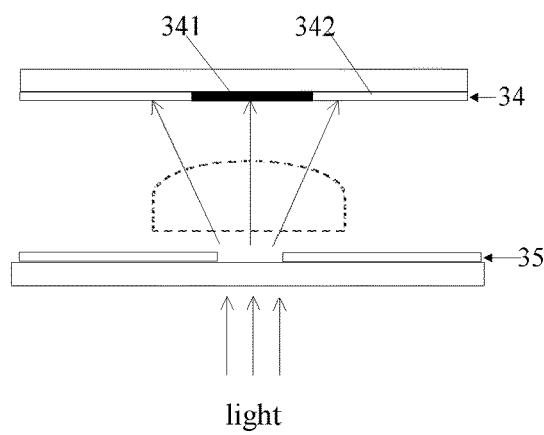
FIG. 6b is a schematic diagram when the display panel in an embodiment of this disclosure realizes a bright state.

The display panel can be used in a display device for displaying images. When performing display, collimated or quasi collimated light is radiated towards the display panel from a side of the second substrate 32 facing away from the first substrate 31. As shown in FIG. 6a, when the liquid crystals in the pixel unit are arranged regularly (all liquid crystals in the pixel unit are divided into a plurality of layers, regular arrangement of the liquid crystals means the liquid crystals in the same layer have consistent orientations), the light passes through the light through hole and is incident into the liquid crystal layer 33 without changing the direction thereof so as to be shielded by the light shielding portion 341 of the first black matrix layer 34, thereby enabling the pixel unit 30a to present a dark state. As shown in FIGS. 5a, 5b and 6b, when an electric field is applied in the pixel unit 30a so as to enable the liquid crystals in a corresponding area to be deflected, the deflected liquid crystals can be equivalent to a lens (as shown by the dashed frame in FIG. 6b). The light would be diffused when it passes through the light through hole 351 to the lens, so that at least a part of light is emitted from the light transmission portion 342 around the light shielding portion 341, so as to generate a corresponding brightness. Therefore, the brightness of each pixel unit can be controlled by controlling the electric field intensity for each pixel unit 30a, so as to display the images. Compared to the conventional display panel, it is not necessary to arrange polarizers for the display panel provided by embodiment of this disclosure, thereby reducing loss of light energy and improving light efficiency and light transmission rate. Moreover, a fast response speed can be achieved by adjusting the light transmission amount through controlling deflection of liquid crystals.

Figure 4A:
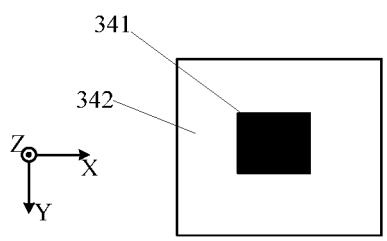
FIG. 4a is a top view of a part of a first black matrix layer located in a pixel unit provided by an embodiment of this disclosure.
Figure 4B:
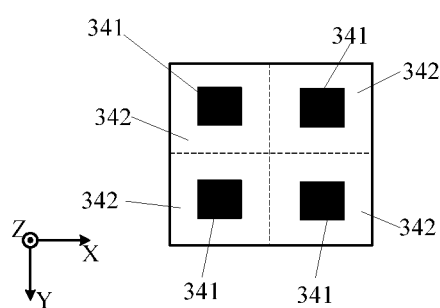
FIG. 4b is a top view of a part of a first black matrix layer located in a pixel unit provided by another embodiment of this disclosure.

The second substrate 32 can be an array substrate provided with a thin film transistor array. A sealant (not shown) for encapsulating the liquid crystal layer is further arranged between the first substrate 31 and the second substrate 32. Each pixel unit 30a may comprise one pixel portion, i.e., there exists only one light shielding portion 341 in a part of the first black matrix layer 34 corresponding to the pixel unit 30a, as shown in FIG. 4a. Alternatively, each pixel unit 30a may comprise a plurality of pixel portions, in such a case, as shown in FIG. 4b, in the part of the first black matrix layer 34 corresponding to the pixel unit 30a, there are a plurality of the light shielding portions 341. Moreover, a plurality of light transmission portion 342 corresponding to a plurality of pixel portions in the same pixel unit 30a can be formed together as one-piece.

As shown in FIGS. 2, 3a, 3b, 5a and 5b, the electrode layer 36 comprises a plurality of first electrodes 361 and at least one second electrode 362. The first electrodes 361 and the second electrode 362 are insulated from each other. The first electrodes 361 are spaced apart from each other. The first electrodes 361 and the second electrode 362 are preferably transparent electrodes.

In an embodiment, only one second electrode 362 is provided, and the second electrode 362 is a continuous planar electrode, so as to simplify the manufacturing process. The first electrode 361 is a strip electrode, which is arranged between the second electrode 362 and the liquid crystal layer 33. A transparent insulating layer 363 is further arranged between the first electrode 361 and the planar electrode 362, so as to insulate the first electrode 361 from the planar electrode 362. When a high level signal and a low level signal are applied to the first electrode 361 and the second electrode 362 respectively, an electric field is generated between the first electrode 361 and the second electrode 362, the electric field lines are as shown by the dotted lines in FIGS. 5a and 5b. At this point, the liquid crystals between the first electrode 361 and the second electrode 362 affected by the electric field would be deflected in a plane perpendicular to the length direction of the first electrode 361, these liquid crystals can be considered as forming a lens, so as to enable the light to be scattered.

Figure 7A:
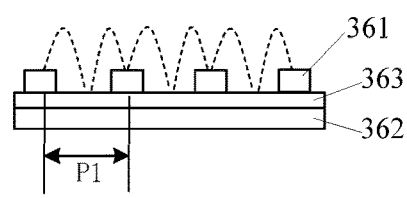
FIG. 7a is a structural schematic view of an electrode layer in an embodiment of this disclosure.

In an example, in case the first electrode 361 is a strip electrode and the second electrode 362 is a planar electrode, as shown in FIG. 7a, an interval P1 between two adjacent first electrodes 361 is in a range of 760 nm~15600 nm (2~20 times of the wavelength of the natural light), i.e., after an electric field is generated between the first electrode 361 and the second electrode 362, a width of the lens equivalent to the deflected the liquid crystals is in a range of 380 nm~7800 nm (1~10 times of the wavelength of the natural light), so as to enable the lens to scatter the light to the most extent when the pixel unit realizes a gray scale of L255, so as to improve light efficiency as far as possible.

Figure 7B:
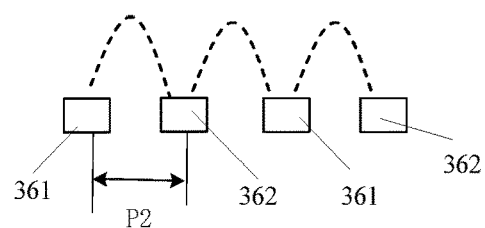
FIG. 7b is a structural schematic view of an electrode layer in another embodiment of this disclosure.

Certainly, the second electrode 362 can also be arranged as a plurality of strip structures like the first electrode 361. The first electrode 361 and the second electrode 362 are arranged alternately, as shown in FIG. 7b. In this case, a pitch P2 between adjacent first electrode 361 and second electrode 362 is in a range of 380 nm~7800 nm (1~10 times of the wavelength of the natural light). In addition, when an electrode layer 36 is arranged at a side of each of the first substrate 31 and the second substrate 32, the second electrodes 362 of the two electrode layers 36 all can be in a plate shape or in a strip shape. Alternatively, the second electrodes 362 in one electrode layer 36 are in a plate shape and the second electrodes 362 in the other electrode layer 36 are in a strip shape.

In an embodiment of this disclosure, the display panel can only comprise one electrode layer, as shown in FIG. 2, the electrode layer 36 is only arranged on the second substrate 32. In such a case, when the electrode layer 36 generates an electric field in the liquid crystal layer 33, the liquid crystals are deflected in a plane perpendicular to the axis Y as shown in FIG. 2, such that the light component whose polarizing direction is parallel to the paper surface are scattered towards the left and right. In order to improve light efficiency further, in some embodiments, as shown in FIGS. 3a and 3b, at a side of each of the first substrate 31 and the second electrode 32, an electrode layer 36 is provided, and the first electrodes 361 of the two electrode layers 36 are perpendicular to each other. In such a case, if a high level signal and a low level signal are applied on the first electrodes 361 and the second electrodes 362 of the two electrode layers 36 respectively, as shown in FIGS. 5a and 5b, the electric field generated by the electrode layer 36 on the first substrate is located in a plane perpendicular to the axis Y, and the electric field generated by the electrode layer 36 on the second substrate 32 is located in a plane perpendicular to the axis X, so as to enable the liquid crystals close to the first substrate 31 to be deflected in the plane perpendicular to the axis Y (as shown in FIG. 5a), and the liquid crystals close to the second substrate 32 to be deflected in the plane perpendicular to the axis X (as shown in FIG. 5b), thereby forming two layers of lens including an upper lens layer and a lower lens layer. The lens of the lower layer enables component of the light whose polarizing direction is perpendicular to the axis Y to be scattered so as to be emitted from the light transmission portions 342 at the left and right sides of the light shielding portion 341 in FIG. 4a, and the lens of the upper layer enables component of the light whose polarizing direction is perpendicular to the axis X to be scattered so as to be emitted from the light transmission portions 342 at the upper and lower sides of the light shielding portion 341 in FIG. 4a, in this way, the light transmittance is further enhanced.

It should be noted that a signal line is further arranged on the first substrate 31 and/or the second substrate 32, so as to provide electric signals to the first electrode 361 and the second electrode 362. As shown in FIGS. 2-3b, the first black matrix layer 34 further comprises a shielding portion 343 for shielding the signal lines.

In an embodiment of this disclosure, the light transmission portion 342 in the first black matrix layer 34 can be fully transparent so as to realize black and white display, and can also present certain colors, so as to enable the display panel to emit color light, thereby realizing color display.

In some embodiments, the light transmission portion 342 can covert the color of light incident to the light transmission portion 342, a predetermined number of pixel units 30a constitute a repeating group. Moreover, the light converted by the light transmission portions 342 corresponding to the same pixel unit 30a in different repeating groups has the same color, the light transmission portions 342 corresponding to different pixel units 30a in the same repeating group can convert the incident light into light of different colors. For example, every three adjacent pixel units 30a constitute a repeating group, the light transmission portions of the three pixel units 30a for each repeating group convert the incident light into light of red, blue and green, respectively.

Specifically, the light transmission portion 342 is made of a color resistance material, so as to enable the color of the light emitted by the light transmission portion 342 to be same as the color of the color resistance material by filtering.

Alternatively, the light transmission portion 342 is made of a quantum dot material. In a same repeating group, the quantum dots of the light transmission portions 342 in different pixel units 30a have different grain sizes, so as to generate light of different colors under excitation of light. Compared to the color resistance material, the quantum dot material can reduce absorption of light so as to increase light transmissivity and improve light efficiency, and the diffusing effect of the light can be strengthened so as to enlarge the visual angle.

Further, as shown in FIGS. 2-3b, the display panel may further comprise a light diffusion film 37 arranged at a side of the first black matrix layer 34 away from the second substrate 32, for diffusing the light, so as to enable the light emitted from the display panel to be more uniform and the visual angle to be wider. The light diffusion film 37 can be arranged between the first black matrix layer 34 and the first substrate 31, and can also be arranged at a side of the first substrate away from the second substrate 32. In an embodiment of this disclosure, as shown in FIGS. 2-3b, the first black matrix layer 34 is arranged at a side of the first substrate 31 facing the liquid crystal layer 33, and the second black matrix layer 35 is arranged at a side of the second substrate 32 facing the liquid crystal layer 33, so that the first black matrix layer 34 and the second black matrix layer 35 are much closer to the liquid crystal layer, thereby preventing the light refraction effect of the first substrate 31 and the second substrate 32 from influencing the light incident to the liquid crystal layer 33 and the light exiting from the liquid crystal layer 33. Moreover, the electrode layer 36 is arranged between the first black matrix layer 34 and the second black matrix layer 35, i.e., when an electrode layer 36 is arranged on the first substrate 31, the electrode layer 36 is arranged between the first black matrix layer 34 and the liquid crystal layer 33, when an electrode layer 36 is arranged on the second substrate 32, the electrode layer 36 is arranged between the second black matrix layer 35 and the liquid crystal layer 33. Thus, it is enabled that the electric field generated by the electrode layer 36 may act on the liquid crystal layer 33 sufficiently.

Further, in some embodiments, the display panel further comprises an alignment layer for aligning the liquid crystals of the liquid crystal layer 33. The alignment layer is in contact with the liquid crystal layer 33. An upper alignment layer and a lower alignment layer can orientate the liquid crystals in the same or different direction. Specifically, the alignment directions of the two alignment layers are both located in a plane perpendicular to the thickness direction of the display panel. When only one electrode layer 36 is arranged in the display panel and the first electrodes 361 in the electrode layer 36 are strip electrodes, the alignment directions of the two alignment layers are both perpendicular to the length direction of the first electrode 361. If both the first substrate 31 and the second substrate 32 are provided with the electrode layer 36, and the first electrodes 361 in the electrode layer 36 are strip electrodes, the alignment direction of each of the two alignment layers is perpendicular to the length direction of respective first electrode 361, so that the liquid crystals are deflected when an electric field is applied.

In an embodiment of this disclosure, the thickness of the liquid crystal layer 33 is in a range of 1 μm~30 μm. Specifically, when one electrode layer 36 is arranged, the thickness of the liquid crystal layer 33 can be in a range of 3 μm~10 μm, and when the electrode layer 36 is arranged at a side of each of the first substrate 31 and the second substrate 32, the thickness of the liquid crystal layer 33 can be in a range of 5 μm~20 μm, so as to enable more light to be emitted from the display panel when the liquid crystals are in a maximally deflected state.

Regarding the display panel in FIG. 2, in an example, the width of the first electrode 361 is 2 μm, the interval between two adjacent first electrodes 361 is 3 μm, the thickness of the liquid crystal layer is 5 μm, the width of the light shielding portion 341 is 12.3 μm, the light transmission portion 342 is made of a quantum dot material, and a backlight source with an angle of divergence of 30° is used to provide backlight to the display panel. In such a case, it can be obtained from detection that the light transmissivity of the display panel of FIG. 2 is in a range of 12%~14%, which is apparently greater than the light transmissivity of 5% in the prior art.

In another example, the display panel is provided with two electrode layers 36, the width of the first electrode 361 is 2 μm, the interval between two adjacent first electrodes 361 is 3 μm, the thickness of the liquid crystal layer is 8 μm~12 μm, the width of the light transmission portion 341 is 12.3 μm, the light transmission portion 342 is made of a quantum dot material, and a backlight source with an angle of divergence of 30° is used to provide backlight to the display panel. In such a case, it can be obtained from detection that the light transmissivity of the display panel in which two electrode layers 36 are arranged is in a range of 23%~28%, which is further increased compared to the light transmissivity of the display panel of FIG. 2.

Figure 8:
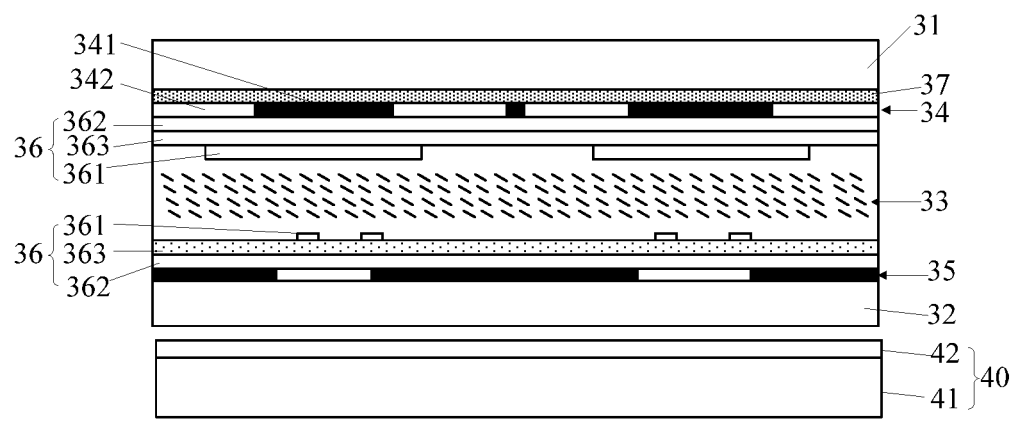
FIG. 8 is a structural schematic view of a display device provided in an embodiment of this disclosure.

As another aspect of this disclosure, a display device is provided, as shown in FIG. 8, comprising a backlight module 40 and a display panel at a light exit side of the backlight module 40. The backlight module 40 is used for providing natural light for the display panel. Moreover, if no electric field is applied to the liquid crystal layer 33, the light of the backlight module 40 is shielded by the light shielding portion 341 after passing through the light through hole 351, when an electric field is applied to the liquid crystal layer 33, after the light of the backlight module 40 passes through the light through hole 351, at least some of light can be emitted from the light transmission portion 342.

When performing display, the backlight module provides light to the display panel. When no electric signal is applied to the electrode layer, the liquid crystal molecules in the liquid crystal layer 33 keep an original state, the light of the backlight module 40 is shielded by the light shielding portion 341, so that the display panel presents a dark state with a gray scale of L0. When an electric signal is applied to the electrode layer 36, the liquid crystal molecules in the liquid crystal layer 33 deflect accordingly, the deflected the liquid crystal molecules functions like lens, thereby scattering the light of the backlight module 40, so that at least a portion of the light is emitted from the light transmission portion 342 to generate a corresponding gray scale. Hence, the display device can perform display without a polarizer, which improves light efficiency.

Figure 9:
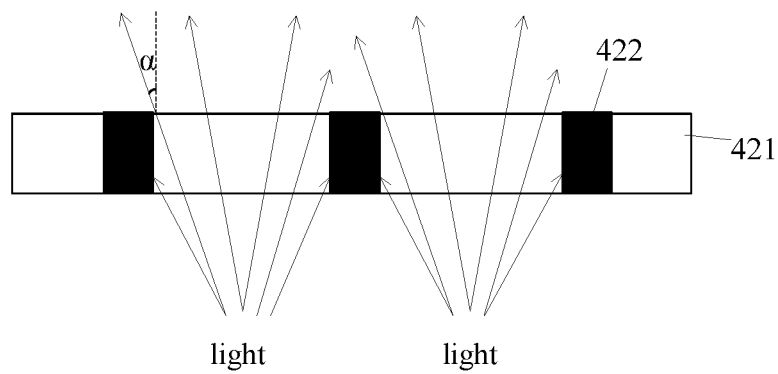
FIG. 9 is for illustrating a definition function of the alignment film to the light direction.

In an embodiment, the light provided by the backlight module 40 is collimated or quasi collimated light, so as to enable the light to be entirely shielded by the light shielding portion when no electric field is applied to the liquid crystal layer. To this end, as shown in FIG. 8, the backlight module 40 comprises a backlight source 41 for emitting light and an alignment film 42 between the backlight source 41 and the display panel. The alignment film 42 is used for defining a divergence angle α of light emitted by the backlight module 40 to be in a range of 0°~30°. In the embodiment of this disclosure, the divergence angle α of the light emitted by the backlight module 40, as shown in FIG. 9, refers to a maximum value of an angle between the emission direction of the light from the backlight module 40 and the thickness direction of the backlight module 40. For example, when the divergence angle of the light emitted by the backlight module 40 is 0°, the backlight module 40 is namely a collimated backlight module. When the divergence angle of the light emitted by the backlight module 40 is 30°, as shown in FIG. 9, for a large amount of light emitted by the backlight module, different light may have different emission directions, and the maximum value (i.e., a) of the angle between the emission direction and the thickness direction of the backlight module 40 is 30°.

The alignment film 42 can comprise a transparent layer 421. A plurality of light shielding barriers are disposed within the transparent layer 421. The height and distribution of the barriers 422 are designed based on actual needs, so that the divergence angle α of the light emitted by the backlight module can be defined. Certainly, the alignment film 42 can also be in form of other structures.

In an embodiment, the electrode layer 36 can comprise a plurality of first electrodes 361 and one second electrode 362. The first electrodes 361 are strip electrodes, and the second electrode 362 is a planar electrode. The first electrodes 361 are spaced apart from each other. The thickness of the liquid crystal layer 33 is 20 μm. In such a case, when the backlight module 40 provides collimated light perpendicular to the display panel, the interval between two adjacent first electrodes 361 can be in a range of 1800 nm~2450 nm. If the backlight module 40 provides divergent light with a divergence angle in a range of 8°~12°, the interval between two adjacent first electrodes 361 can be in a range of 3250 nm~4500 nm. When the backlight module 40 provides divergent light with a divergence angle in a range of 18°~22°, the interval between two adjacent first electrodes 361 can be in a range of 5450 nm~10000 nm.

What are described above are the display panel and the display device provided by embodiments of this disclosure, from which it can be seen that a polarizer to polarize the natural light is not necessary for the display panel provided by the embodiments of the disclosure, which reduces loss of light energy and improves light efficiency and light transmittance, thereby improving the display effect of the display device. Moreover, the amount of light emitted from the display device is adjusted by controlling deflection of liquid crystals, so a fast response can be achieved.

It could be understood that the above embodiments are only exemplary examples for explaining the principle of the disclosure. However, the present invention is not so limited. The ordinary skilled person in the art can make various modifications and improvements to the disclosure without departing from the spirit and the essence of the present invention. These modifications and improvements should also be regarded as the protection scopes of the invention.

The invention claimed is:

1. A display panel, comprising:
   a first substrate and a second substrate opposite to each other;
   a liquid crystal layer between the first substrate and the second substrate;
   a first black matrix layer located at a side of the first substrate facing the second substrate;
   a second black matrix layer located at a side of the second substrate facing the first substrate, and
   a first electrode layer located at a side of the first substrate facing the liquid crystal layer and a second electrode layer located at a side of the second substrate facing the liquid crystal layer, the first electrode layer and the second electrode layer being configured to generate an electric field in the liquid crystal layer,
   wherein the display panel comprises a plurality of pixel units, each pixel unit comprising at least one pixel portion,
   wherein a region of the first black matrix layer corresponding to the pixel portion comprises a light shielding portion and a light transmission portion surrounding the light shielding portion, a region of the second black matrix layer corresponding to the light shielding portion is provided with a light through hole, and
   wherein an orthogonal projection of the light shielding portion on the second black matrix layer covers the light through hole,
   wherein each of the first electrode layer and the second electrode layer comprises multiple first electrodes and one second electrode, each first electrode of the first electrodes is a strip electrode, the second electrode is a continuous planar electrode,
   wherein the first electrodes of the first electrode layer are located in a same layer and spaced apart from each other, and the first electrodes of the second electrode layer are located in a same layer and spaced apart from each other,
   wherein a length extension direction of the first electrodes of the first electrode layer is perpendicular to a length extension direction of the first electrodes of the second electrode layer,
   wherein both an orthogonal projection of each first electrode of the first electrodes of the first electrode layer and an orthogonal projection of each first electrode of the first electrodes of the second electrode layer on the second black matrix layer at least partly overlap the light through hole, and
   wherein the display panel further comprises an insulating layer between the first electrodes and the second electrode of each of the first electrode layer and the second electrode layer.

2. The display panel according to claim 1, wherein the first electrodes are arranged between the second electrode and the liquid crystal layer.

3. The display panel according to claim 2, wherein an interval between two adjacent first electrodes is in a range of about 760 nm~15600 nm.

4. The display panel according to claim 1, wherein the light transmission portion is used for converting a color of incident light to the light transmission portion, a predetermined number of pixel units in the plurality of pixel units constitute a repeating group, wherein the light transmission portions corresponding to a same pixel unit in different repeating groups converts the incident light into light of a same color, and the light transmission portions corresponding to different pixel units in a same repeating group convert the incident into light of different colors.

5. The display panel according to claim 4, wherein the light transmission portion is made of a color resistance material.

6. The display panel according to claim 4, wherein the light transmission portion is made of a quantum dot material.

7. The display panel according to claim 1, wherein the display panel further comprises a light diffusion film arranged at a side of the first black matrix layer away from the second substrate.

8. The display panel according to claim 1, wherein the first black matrix layer is arranged between the first substrate and the liquid crystal layer, the second black matrix layer is arranged between the second substrate and the liquid crystal layer, wherein the first electrode layer and the second electrode layer are located between the first black matrix layer and the second black matrix layer.

9. The display panel according to claim 1, wherein the display panel further comprises alignment layers located at two sides of the liquid crystal layer respectively, for performing alignment to liquid crystals of the liquid crystal layer.

10. The display panel according to claim 1, wherein a thickness of the liquid crystal layer is in a range of about 1 μm~30 μm.

11. A display device, comprising a backlight module and a display panel according to claim 1 arranged at a light exit side of the backlight module, wherein the backlight module is used for providing natural light for the display panel.

12. The display device according to claim 11, wherein the backlight module comprises a backlight source for emitting light and an alignment film between the backlight source and the display panel, wherein the alignment film is used for defining a divergence angle of light emitted from the backlight module to be in a range of about 0°~30°.

13. The display device according to claim 12, wherein the alignment film comprises a transparent layer and a plurality of light shielding barriers in the transparent layer.

14. The display panel according to claim 11, wherein the first electrodes are arranged between the second electrode and the liquid crystal layer.

\* \* \* \* \*